United States Patent
Kimura et al.

(10) Patent No.: US 10,442,401 B2
(45) Date of Patent: Oct. 15, 2019

(54) BRUSHLESS WIPER MOTOR

(71) Applicant: Mitsuba Corporation, Gunma (JP)

(72) Inventors: Masaaki Kimura, Gunma (JP);
Tomohiko Annaka, Gunma (JP);
Toshiyuki Kimura, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 16/029,989

(22) Filed: Jul. 9, 2018

(65) Prior Publication Data

US 2018/0312138 A1 Nov. 1, 2018

Related U.S. Application Data

(63) Continuation of application No. 15/565,531, filed as application No. PCT/JP2016/061295 on Apr. 6, 2016, now Pat. No. 10,040,426.

(30) Foreign Application Priority Data

Apr. 16, 2015 (JP) .................................. 2015-083856

(51) Int. Cl.
*B60S 1/08* (2006.01)
*H02K 21/14* (2006.01)
(Continued)

(52) U.S. Cl.
CPC ............... *B60S 1/0822* (2013.01); *B60S 1/08* (2013.01); *B60S 1/166* (2013.01); *H02K 7/081* (2013.01);
(Continued)

(58) Field of Classification Search
CPC ...... H02P 1/04; H02P 6/00; H02P 6/14; H02P 1/00; H02P 3/00; H02P 23/00;
(Continued)

(56) References Cited

U.S. PATENT DOCUMENTS 5,355,061 A 10/1994 Forhan
7,294,986 B2 * 11/2007 Marentette ................ B60S 1/08
318/443
(Continued)

FOREIGN PATENT DOCUMENTS

DE 102012223835 A1 6/2014
JP 2005-041285 A 2/2005
(Continued)

OTHER PUBLICATIONS

Supplementary European Search Report for Serial No. EP 16 77 9959 dated Oct. 15, 2018.
(Continued)

*Primary Examiner* — Antony M Paul
(74) *Attorney, Agent, or Firm* — McCormick, Paulding & Huber LLP

(57) ABSTRACT

Since a shape of a stator 44 is made mirror symmetric with respect to a rotor 45 as a 4-pole/6-slot type, rotational deflection of the rotor 45 can be suppressed. As the minimum number of poles and the minimum number of slots, which can suppress the rotational deflection of the rotor 45, a frequency of magnetic noises approaches a frequency of mechanical noises. Thus, it is possible to integrate the whole noises generated by the DR-side wiper motor 21 into a low frequency range thereof, and to make the acoustic sensitivity (dB) of a vehicle interior smaller. Since the stator 44 is fixed inside a housing 40 and mounting legs fixed to a vehicle body fixed portion are provided in the housing 40, the stator 40, which is a source of the magnetic noises, can be fixed to a vehicle via only the housing 40. Therefore, a brushless wiper motor with quietness improved further can be designed.

6 Claims, 10 Drawing Sheets

DRIVER'S SEAT SIDE ◀━━━━━━━━━━━━━━━━━━━━━▶ PASSENGER'S SEAT SIDE

(51) Int. Cl.
*H02K 7/14* (2006.01)
*B60S 1/16* (2006.01)
*H02K 29/08* (2006.01)
*H02K 7/08* (2006.01)
*H02K 11/33* (2016.01)
*H02P 6/08* (2016.01)
*B60S 1/04* (2006.01)

(52) U.S. Cl.
CPC .............. *H02K 7/14* (2013.01); *H02K 11/33* (2016.01); *H02K 21/14* (2013.01); *H02K 29/08* (2013.01); *B60S 1/0438* (2013.01); *B60S 1/0444* (2013.01); *H02P 6/08* (2013.01); *Y02T 10/641* (2013.01)

(58) Field of Classification Search
CPC .. H02P 27/00; H02P 27/04; H02P 1/42; B60S 1/08; H02K 7/116; H02K 5/02; H02K 5/16; H02K 11/0073; H02K 5/22; H02K 5/18; H02K 9/22
USPC .......... 318/400.01, 443, 444, 280, 281, 282, 318/283, 138, 254, 254.1, 439, 256, 257, 318/258, 259, 260, 261; 15/250 R, 15/250.12, 250.13, 250.16, 250.17, 15/250.001, 250.003, 250.3
See application file for complete search history.

(56) References Cited

U.S. PATENT DOCUMENTS

| 7,389,561 B2 | 6/2008 | Bledsoe et al. |
| 7,676,880 B2 | 3/2010 | Moein et al. |

FOREIGN PATENT DOCUMENTS

| JP | 2013-223317 A | 10/2013 |
| JP | 2014-195389 A | 10/2014 |

OTHER PUBLICATIONS

International Search Report for PCT Serial No. PCT/JP2016/061295 dated Jun. 24, 2016.

* cited by examiner

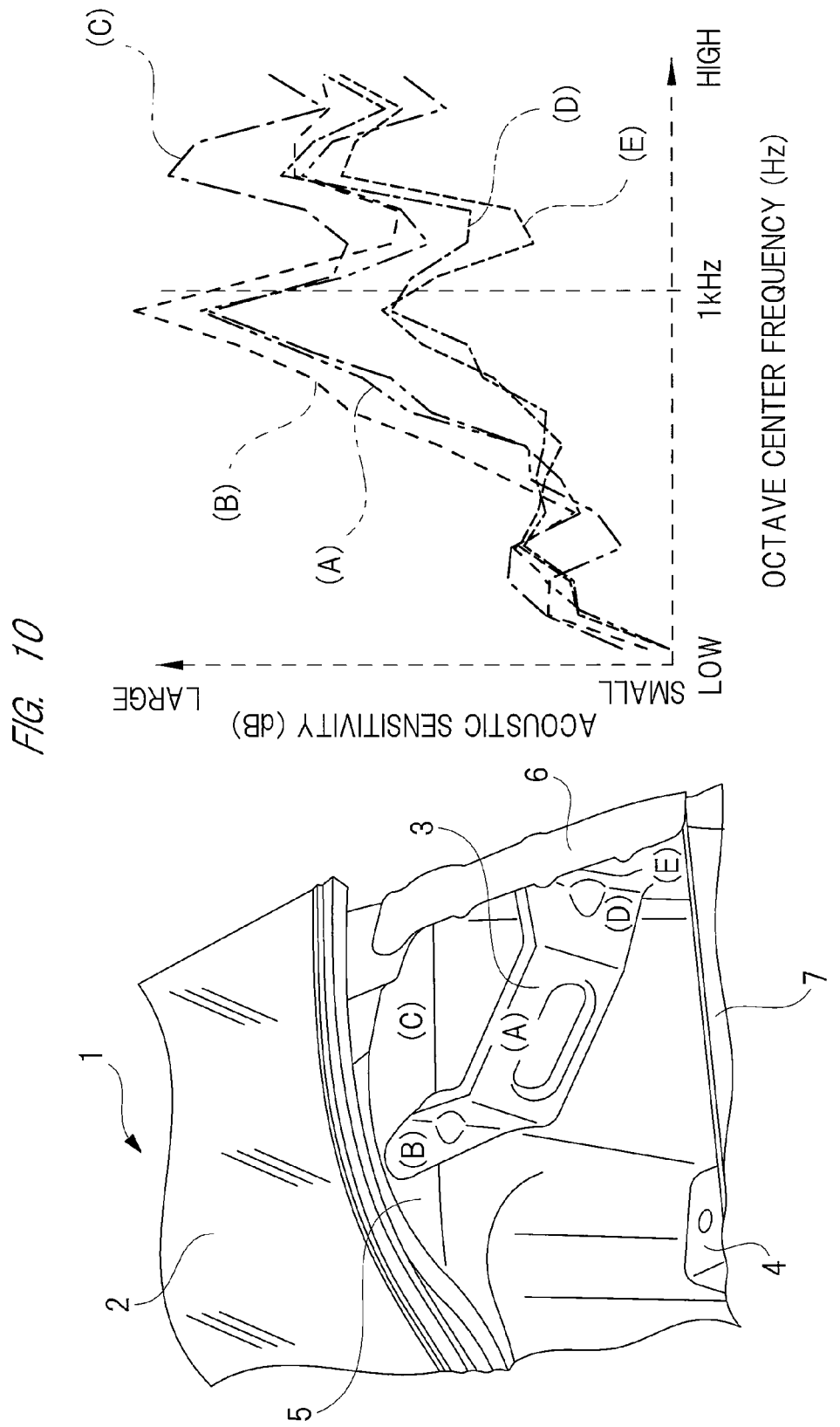

BRUSHLESS WIPER MOTOR

CROSS-REFERENCE TO RELATED APPLICATIONS

This application is a continuation of U.S. patent application Ser. No. 15/565,531, filed Oct. 10, 2017, which is a National Stage application of International Patent Application No. PCT/JP2016/061295, filed on Apr. 6, 2016, which claims priority to Japanese Patent Application No. 2015-083856, filed on Apr. 16, 2015, each of which is hereby incorporated by reference in its entirety.

TECHNICAL FIELD

The present invention relates to a brushless wiper motor that causes a wiper member provided above a windshield of a vehicle to swing.

BACKGROUND ART

Conventionally, a wiper motor with a decelerating mechanism, which has a small size and from which a large output power can be obtained, is adopted as a driving source for a wiper device that is mounted in a vehicle, such as an automobile. This makes it possible to improve mountability of the wiper device in a vehicle body. Further, in order to suppress propagation of electric noises to in-vehicle equipment, such as a radio, a brushless wiper motor that does not have a commutator and a brush may be adopted. Thus, adoption of the brushless wiper motor allows generation of electric noises to be suppressed. Since the brushless wiper motor does not have a commutator and/or a brush, it is possible to improve quietness further, and to reduce a size and a weight thereof.

Japanese Patent Application Publication No. 2013-223317 describes such a brushless wiper motor with a decelerating mechanism, for example. The brushless wiper motor described in Japanese Patent Application Publication No. 2013-223317 includes a motor unit and a decelerating mechanism unit. The motor unit has a yoke, and the decelerating mechanism has a gear housing.

A stator in which a U-phase coil, a V-phase coil, and a W-phase coil are wound is fixed inside the yoke. A rotor is rotatably disposed inside the stator. Further, six magnetic poles of a permanent magnet are embedded inside the rotor. The brushless wiper motor having a so-called interior permanent magnet (IPM) structure is adopted.

On the other hand, the decelerating mechanism, which is composed of a worm and a worm wheel, is housed inside the gear housing. The worm is rotated by the rotor, and thus, turning force with a high torque is outputted from an output shaft of the worm wheel.

SUMMARY

However, in the above brushless wiper motor described in Japanese Patent Application Publication No. 2013-223317, there is still a problem that magnetic noises are generated. In particular, an electric vehicle, a hybrid vehicle, and the like may travel or run by only an electric motor in a state where an engine is stopped. For this reason, it is required to suppress generation of magnetic noises to improve its quietness. Therefore, inventors of the present invention have measured acoustic sensitivity (dB) of a vehicle interior, and have developed a brushless wiper motor having a structure that allows the acoustic sensitivity (dB) of the vehicle interior to be reduced on the basis of the result of measurement.

Here, FIG. 10 shows a diagram for explaining a fixing structure of a brushless wiper motor fixed to a vehicle and a graph for explaining acoustic sensitivity thereof. The brushless wiper motor is installed in a mounting space shown in FIG. 10. More specifically, a first bracket 3 and a second bracket 4 are provided in the vicinity of a front end portion of a windshield 2 provided in a vehicle 1. The brushless wiper motor (not shown in the drawing) is fixed to the first bracket 3 and the second bracket 4. One end of the first bracket 3 in a longitudinal direction thereof is fixed to a cowl top panel 5 extending in a right-to-left direction of the vehicle 1. Further, the other end of the first bracket 3 in the longitudinal direction thereof is fixed to a front side member 6 extending in a front-to-rear direction of the vehicle 1. Moreover, the second bracket 4 is disposed at a front side of the cowl top panel 5, and is fixed to a dash panel upper 7 extending in the right-to-left direction of the vehicle 1.

The acoustic sensitivity (dB) of the brushless wiper motor during an operation has been measured at a location near the first bracket 3 placed closer to the vehicle interior of the vehicle 1. This measurement has provided results as shown in FIG. 10. Namely, a center frequency in an octave band measured at a portion (B) at the cowl top panel 5 side, which is particularly audible, becomes the maximum near a frequency "1 kHz" compared with the center frequency measured at a fixed portion (A) of the brushless wiper motor. On the other hand, the center frequency measured at a portion (C) closer to the front side member 6 than the portion (B) on the cowl top panel 5 side and the center frequency measured at portions (D) and (E) further closer to the front side member 6 than the portion (C) becomes smaller than the center frequency measured at the portion (B) around "1 kHz".

Namely, by approaching a fixed portion of the brushless wiper motor fixed to the vehicle body toward the front side member 6, the acoustic sensitivity (dB) of the vehicle interior can be reduced to a certain extent even in the case of the conventional brushless wiper motor. However, in a case where noises generated by the brushless wiper motor is suppressed from propagating to the vehicle interior by modifying a shape of the vehicle side, this causes a degree of freedom in designing the vehicle (designability and the like) to be reduced. Thus, it is considered to be unrealistic.

It is an object of the present invention to provide a brushless wiper motor that is improved in quietness so that the brushless wiper motor can be applied to a wide range of vehicles including light vehicles, luxury vehicles, electric vehicles, and hybrid vehicles, regardless of a fixing structure on a vehicle side.

According to one aspect of the present invention, there is provided a brushless wiper motor configured to cause a wiper member to swing, the wiper member wiping an object attached onto a windshield of a vehicle away from the windshield, the brushless wiper motor including: a stator fixed inside a housing; a coil wound around the stator; six slots provided in the stator, the coil being disposed in each of the slots; a rotor configured to rotate with respect to the stator; a permanent magnet provided on the rotor, the permanent magnet having four magnetic poles arranged alternately along a direction of rotation of the rotor; a decelerating mechanism housed in the housing, the decelerating mechanism being configured to reduce speed of rotation of the rotor; an output shaft configured to transmit rotation of the decelerating mechanism to the wiper member; and a plurality of fixing legs provided on the housing, wherein at least one of the plurality of fixing legs is fixed to a vehicle body fixed portion that extends in a right-to-left direction of the vehicle.

According to another aspect of the present invention, frequencies of noises generated by the brushless wiper motor is made equal to or lower than 500 Hz.

According to still another aspect of the present invention, the decelerating mechanism includes: a worm rotated by the rotor; and a worm wheel provided with teeth, the teeth being configured to engage with the worm, the output shaft being provided on a center of rotation of the worm wheel, wherein an axial dimension of the rotor is smaller than an axial dimension of the worm.

According to still another aspect of the present invention, at least one of the plurality of fixing legs is fixed to the vehicle body fixed portion via a buffering member.

According to still another aspect of the present invention, the stator is provided with teeth each of which faces other one with respect to the rotor.

According to the present invention, by constituting a brushless wiper motor as a 4-pole/6-slot type, a shape of the stator can be made mirror symmetric with respect to the rotor. Therefore, rotational deflection of the rotor can be suppressed. Further, as the minimum number of poles and the minimum number of slots that can suppress rotational deflection of the rotor, a frequency of magnetic noises generated during the rotation of the rotor can approach a frequency of mechanical noises of the decelerating mechanism (low frequency around about 300 Hz). This makes it possible to integrate each of frequencies of magnetic noises and mechanical noises generated by the brushless wiper motor into a low frequency range thereof. Thus, it is possible to reduce the acoustic sensitivity (dB) of a vehicle interior to improve the quietness of the motor. Therefore, the brushless wiper motor can easily be applied to light vehicles and luxury vehicles, and it can also be applied to electric vehicles, hybrid vehicles and the like (improvement in general versatility).

Further, the fixing legs fixed to the vehicle body fixed portion are provided in the housing while fixing the stator inside the housing. Thus, the stator, which is a source of the magnetic noises, can be fixed to the vehicle body fixed portion only via the housing. Therefore, the acoustic sensitivity (dB) of the vehicle interior can be estimated easily by merely calculating rigidity of the housing, for example. In other words, it becomes possible to design a brushless wiper motor having a structure advantageous for improvement of quietness certainly and easily. This makes it possible to provide a brushless wiper motor with quietness improved further.

BRIEF DESCRIPTIONS OF THE DRAWINGS

FIG. 10 shows a diagram for explaining a fixing structure of a brushless wiper motor to a vehicle and the acoustic sensitivity of the brushless wiper motor.

DETAILED DESCRIPTION

Hereinafter, a first embodiment according to the present invention will be described in detail with reference to the drawings.

Figure 1:
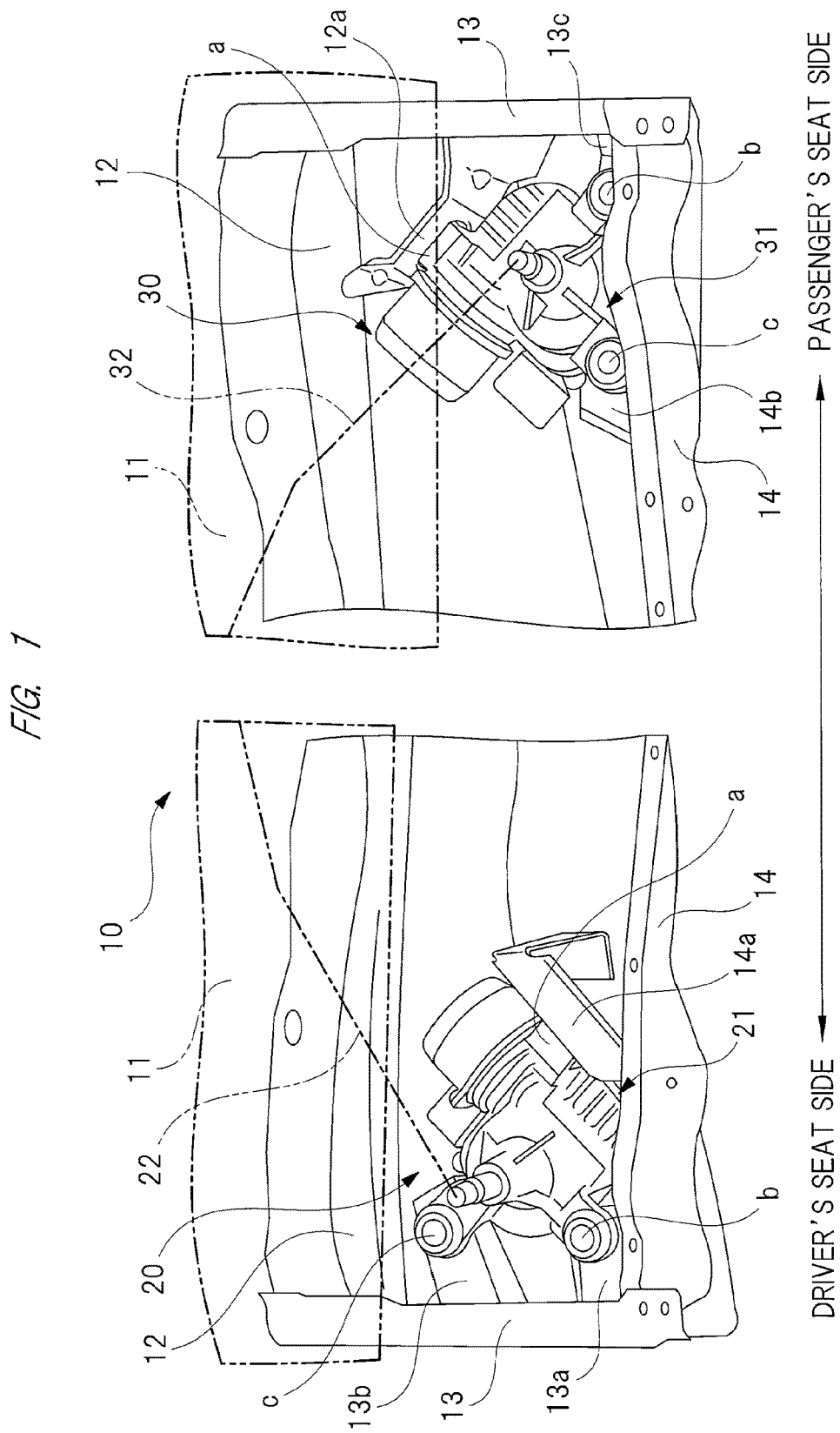
FIG. 1 is a schematic diagram showing a mounting state of a wiper device on a vehicle.
Figure 2:
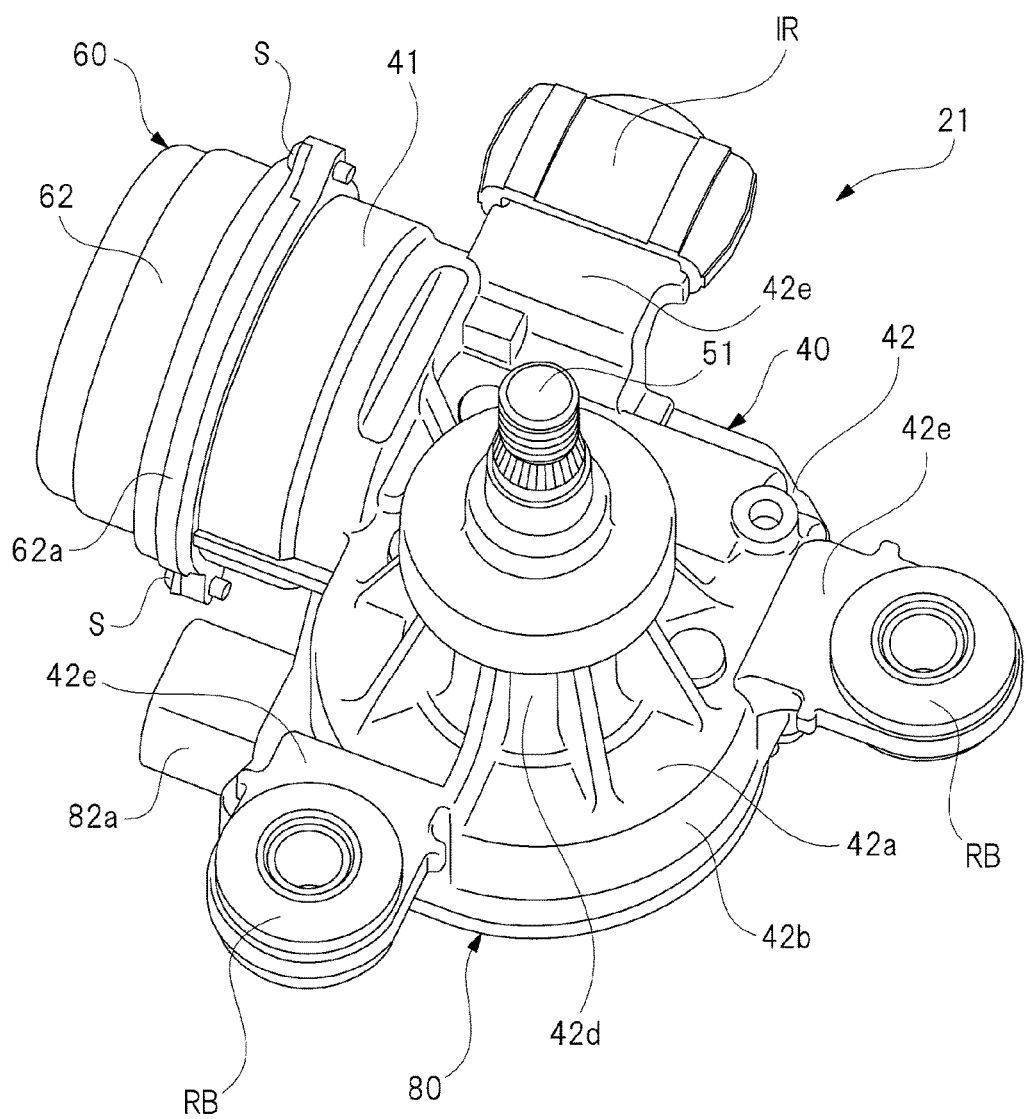
FIG. 2 is a perspective view of a DR-side wiper motor of FIG. 1 when viewed from an output shaft side.
Figure 3:
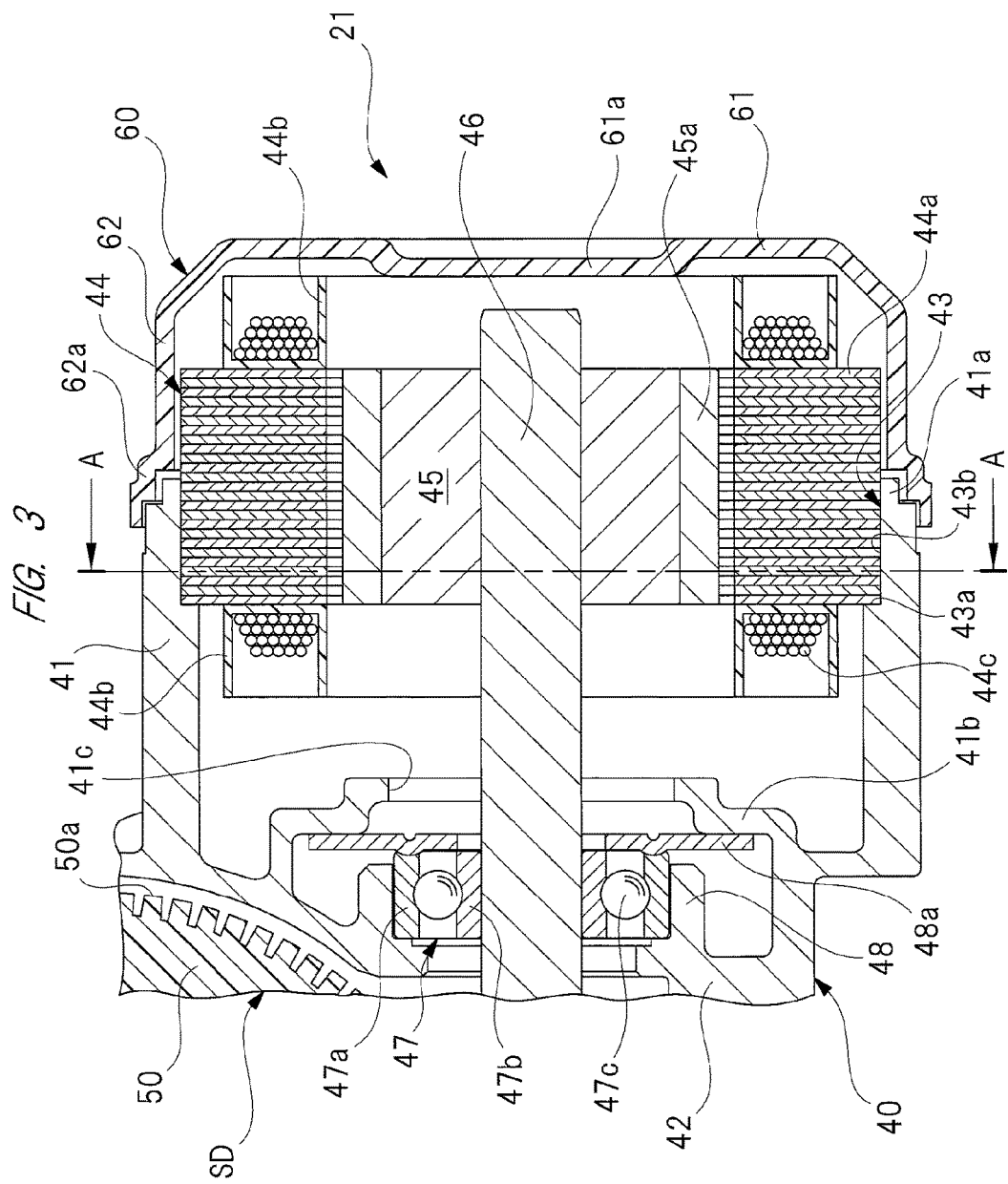
FIG. 3 is a partially enlarged sectional view for explaining a structure of a motor unit.
Figure 4:
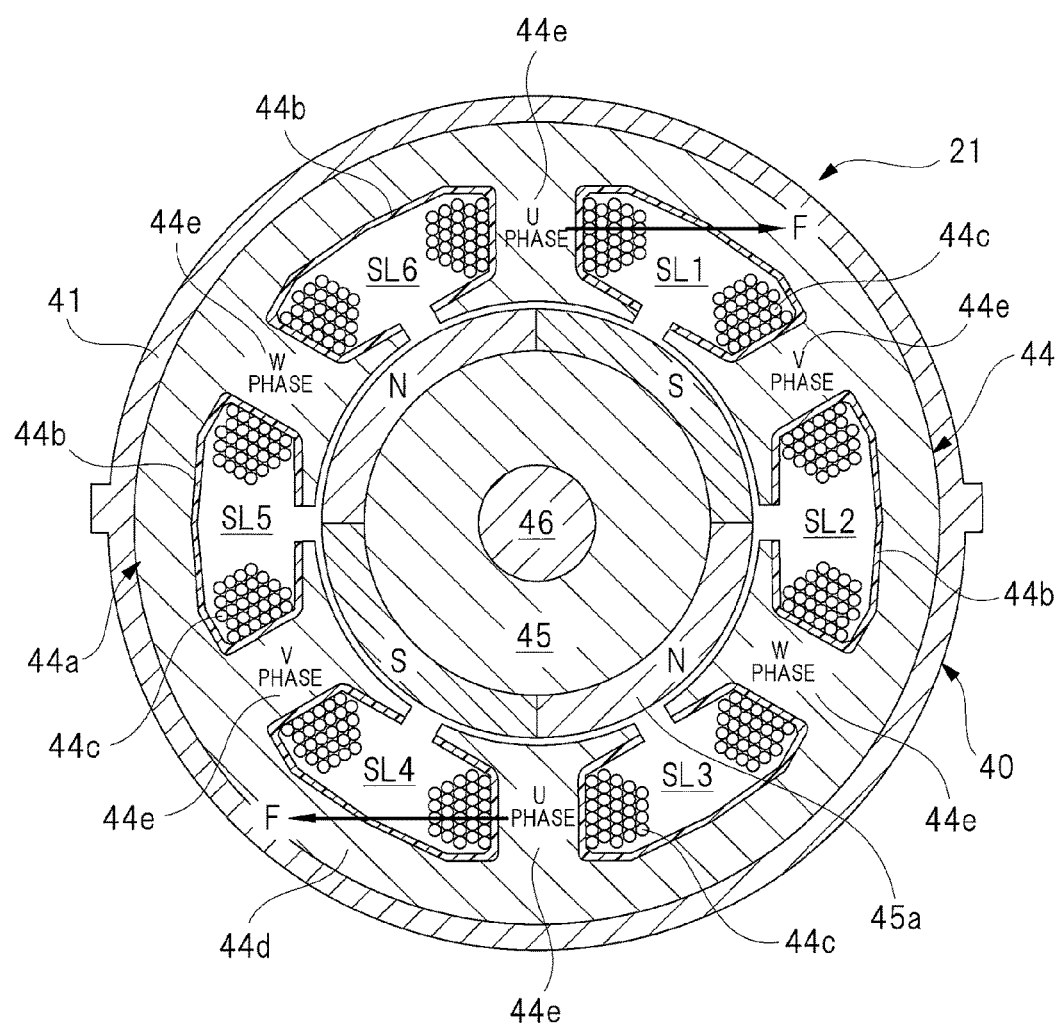
FIG. 4 is a sectional view taken along an A-A line of FIG. 3.
Figure 5:
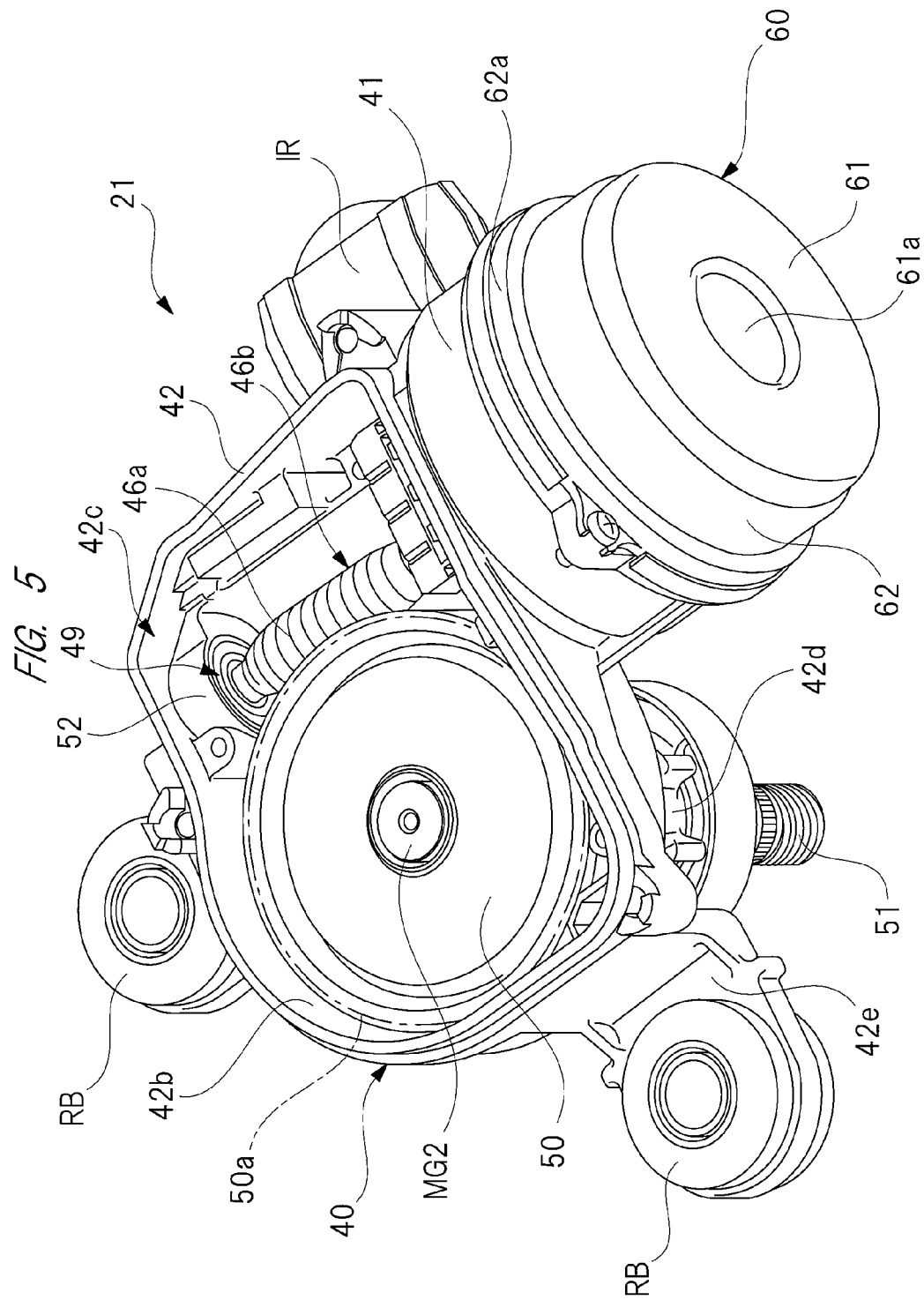
FIG. 5 is a perspective view showing detail inside a housing (without a gear cover).
Figure 6:
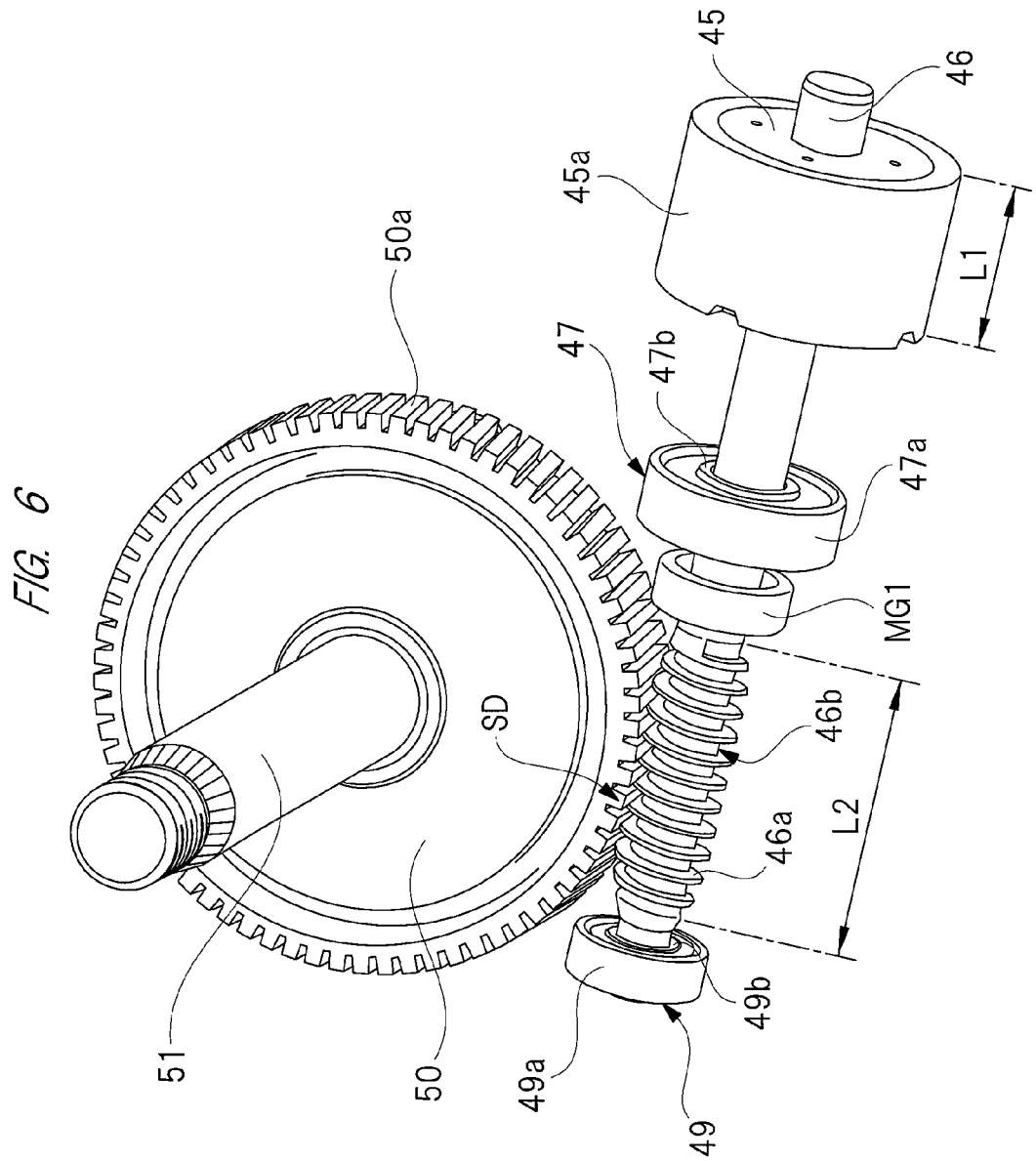
FIG. 6 is a perspective view showing a decelerating mechanism, a rotating shaft, and a rotor.
Figure 7:
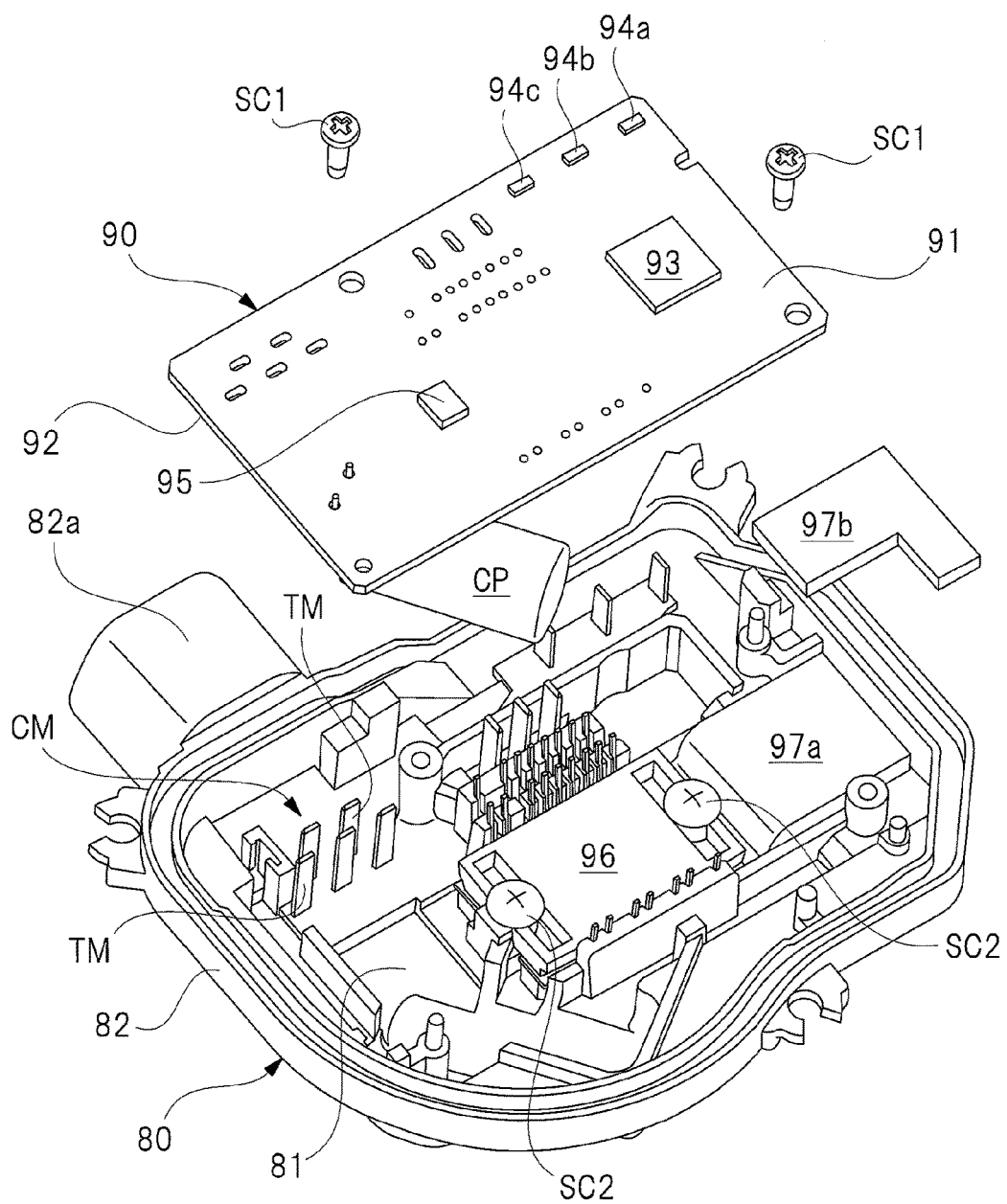
FIG. 7 is an exploded perspective view showing the interior of the gear cover.
Figure 8:
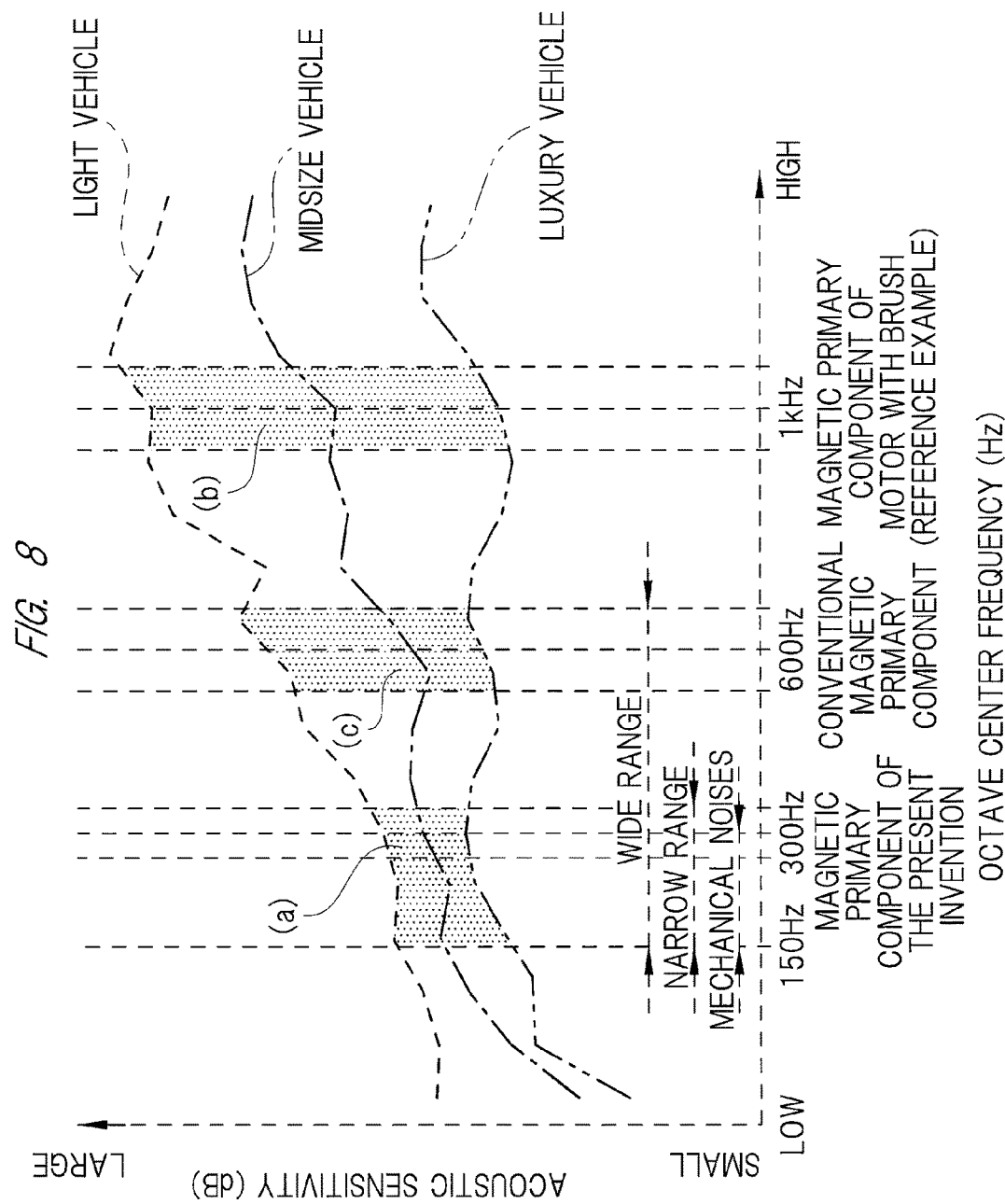
FIG. 8 is a graph in which acoustic sensitivity (dB) of a vehicle interior (vicinity of a driver's seat) of each of a light vehicle, a midsize vehicle and a luxury vehicle is compared with each other.

FIG. 1 is a schematic diagram showing a mounting state of a wiper device on a vehicle. FIG. 2 is a perspective view of a DR-side wiper motor of FIG. 1 when viewed from an output shaft side. FIG. 3 is a partially enlarged sectional view for explaining a structure of a motor unit. FIG. 4 is a sectional view taken along an A-A line of FIG. 3. FIG. 5 is a perspective view showing detail inside a housing (without a gear cover). FIG. 6 is a perspective view showing a decelerating mechanism, a rotating shaft, and a rotor. FIG. 7 is an exploded perspective view showing the interior of the gear cover. FIG. 8 is a graph in which acoustic sensitivity (dB) of a vehicle interior (vicinity of a driver's seat) of each of a light vehicle, a midsize vehicle and a luxury vehicle is compared with each other.

As shown in FIG. 1, a windshield (front windshield) 11 is provided at a front side of a vehicle 10, such as an automobile. A DR-side wiper device 20 and an AS-side wiper device 30 are mounted on the driver's seat side and a passenger's seat side along a vehicle width direction of the vehicle 10 (a right-to-left direction in FIG. 1) and at a front end portion of the windshield 11 (a lower side in FIG. 1), respectively. In this manner, as a wipe apparatus according to the present embodiment, an opposite wiping type wiper apparatus that includes a wiper device on the driver's seat side and a wiper device on the passenger's seat side is adopted. Here, the word "DR-side" denotes a "driver's seat side", and the word "AS-side" denotes a "passenger's (assistant driver's) seat side".

The DR-side wiper device 20 and the AS-side wiper device 30 have a DR-side wiper motor 21 and an AS-side wiper motor 31, respectively. The DR-side wiper motor 21 and the AS-side wiper motor 31 respectively drive a DR-side wiper arm 22 and an AS-side wiper arm 32 (not shown in detail in the drawing), which are disposed on the windshield 11, so as to swing at predetermined swing angles. As a result, wiper blades (not shown in the drawing) respectively provided to front ends of the wiper arms 22, 32 carry out a reciprocating wiping-out operation on the windshield 11, whereby rainwater or the like (attached object) is wiped away from the windshield 11 to secure a fine field of view. Here, the wiper arms 22, 32 and wiper blades constitute a wiper member of the present invention.

A cowl top panel 12, which forms a vehicle body of the vehicle 10, is provided at a front end side of the vehicle 10 and in the vicinity of the front end portion of the windshield 11. The cowl top panel 12 extends between the DR side and the AS side of the vehicle 10, that is, extends so as to traverse the vehicle 10 in the right-to-left direction, and constitutes a vehicle body fixed portion of the present invention. Further, front side members 13 are provided on the DR side and the AS side of the vehicle 10, respectively. Each of the front side members 13 extends in the front-to-rear direction of the vehicle 10 (an up-and-down direction in FIG. 1), and constitutes the vehicle body. Moreover, a dash panel upper 14 is provided on a front side of the cowl top panel 12. The dash panel upper 14 also extends so as to traverse the vehicle 10 in the right-to-left direction, and constitutes the vehicle body fixed portion of the present invention.

Here, both sides in a longitudinal direction of the cowl top panel 12 and both sides in a longitudinal direction of the dash panel upper 14 are firmly fixed to the front side members 13 of the DR side and AS side by welding or the like, respectively. Each of the cowl top panel 12, the front side member 13, and the dash panel upper 14 is made of a high-tensile steel plate (high strength material) in the form of a predetermined shape.

The DR-side wiper device 20 is fixed to a DR-side insertion fixing portion 14a, a DR-side first screw fixing portion 13a and a DR-side second screw fixing portion 13b. The DR-side insertion fixing portion 14a is fixed to the dash panel upper 14 by welding or the like. The DR-side first screw fixing portion 13a and the DR-side second screw fixing portion 13b are fixed to the front side member 13 of the DR side by welding or the like. On the other hand, the AS-side wiper device 30 is fixed to an AS-side first screw fixing portion 14b, an AS-side second screw fixing portion 13c, and an AS-side insertion fixing portion 12a. The AS-side first screw fixing portion 14b is fixed to the dash panel upper 14 by welding or the like. The AS-side second screw fixing portion 13c is fixed to the front side member 13 of the AS side by welding or the like. The AS-side insertion fixing portion 12a is fixed to both the front side member 13 of the AS side and the cowl top panel 12 by welding or the like. Here, the AS-side insertion fixing portion 12a has the similar shape to that of a first bracket 3 shown in FIG. 10.

In this manner, each of the DR-side wiper device 20 and AS-side wiper device 30 is fixed to the vehicle body of the vehicle 10 by being supported at three points. As shown in FIG. 1, the same one is used as each of the DR-side wiper motor 21 and the AS-side wiper motor 31. Each of the wiper motors 21, 31 has three mounting portions "a", "b", and "c". The mounting portion "a" of the mounting portions "a", "b", and "c" is fixed to the vehicle body by being inserted therein. On the other hand, each of the mounting portions "b" and "c" of the mounting portions "a", "b", and "c" is fixed to the vehicle body via a fixing bolt (not shown in the drawing).

Since the wiper motors 21, 31 are the same, a detailed structure of the DR-side wiper motor 21 will be described as a representative thereof using the drawings.

As shown in FIGS. 2 to 7, the DR-side wiper motor (brushless wiper motor) 21 includes a housing 40 made of aluminum, a motor cover 60 made of plastic, and a gear cover 80 made of plastic. The housing 40, the motor cover 60, and the gear cover 80 are coupled to each other with a plurality of fastening screws S (two of them are shown in FIG. 2). Here, sealing members (not shown in the drawing), such as O-ring, are provided between the housing 40 and the motor cover 60 and between the housing 40 and the gear cover 80, respectively. They prevent rainwater or the like from entering into the inside of the DR-side wiper motor 21.

The housing 40 is formed into a predetermined shape by casting a molten aluminum material or the like. The housing 40 includes a motor housing unit 41 and a decelerating mechanism housing unit 42. The motor housing unit 41 is formed into a bottomed cylindrical shape, as shown in FIG. 3. One end of the motor housing unit 41 in an axial direction (at a right side in FIG. 3) is formed as an opening portion.

A stepped and annular cover fitting portion 41a, on which a fitting portion 62a of the motor cover 60 is mounted, is provided at the opening portion. On the other hand, an annular bottom 41b is provided at the other end of the motor housing unit 41 in the axial direction (at a left side in FIG. 3). A through hole 41c, through which a rotating shaft 46 goes rotatably, is formed at a central portion of the annular bottom 41b.

An annular stepped portion 43 is formed on the interior of the motor housing unit 41. The stepped portion 43 is composed of an annular bottom wall 43a and a cylindrical side wall 43b. A stator 44 is housed inside the stepped portion 43. The stator 44 is formed into a substantially cylindrical shape by stacking a plurality of steel plates 44a made of a magnetic material and bonding them together. A roughly half of an outer periphery of the stator 44 that is positioned closer to the decelerating mechanism housing unit 42 along the axial direction is pressed into the side wall 43b that forms an inner periphery of the motor housing unit 41, whereby both the stator 44 and the motor housing unit 41 are fixed firmly together. An uneven engaging portion (not shown in the drawing) is formed between the outer periphery of the stator 44 and the inner periphery of the side wall 43b. This prevents the stator 44 from rotating relative to the housing 40 when the DR-side wiper motor 21 is driven.

Coil bobbins 44b made of resin, which is an insulator, are provided on both sides of the stator 44 in an axial direction so as to project from the stator 44. Coils 44c of a U phase, a V phase, and a W phase (three phases) are wound in the coil bobbins 44b by the predetermined winding number of times. An end portion of each of these coils 44c of the U phase, V phase, and W (not shown in the drawing) is electrically connected to the others to form a star connection (Y connection) pattern. However, the connection pattern of the coils 44c is not limited to the star connection pattern as a method of connecting the respective coils 44c. Other connecting method such as delta connection (triangular connection) pattern and the like may be adopted, for example.

Further, as shown in FIG. 4, each of the plurality of steel plates 44a forming the stator 44 has an annular body portion 44d. An outer diameter dimension of the body portion 44d is set to be slightly larger than an inner diameter dimension of the motor housing unit 41. As a result, the stator 44 is pressed into the inside of the motor housing unit 41.

Six teeth 44e around which the coils 44c are wound are integrally provided in the inside of the body portion 44d in a radial direction. These teeth 44e are arranged at equal intervals (60° intervals) in a circumferential direction of the body portion 44d. Further, six slots SL1 to SL6, in each of which the coils 44c are arranged via the coil bobbin 44b serving as the insulator, are arranged such that each slot is located between a pair of teeth 44e adjacent to each other.

Each of the coils 44c is electrically connected to a control board 90 (see FIG. 7) fixed inside the gear cover 80 via a wiring unit (not shown in the drawing), which is provided in the housing 40. A driving current is supplied to each of the coils 44c at predetermined timing from a FET module 96 (see FIG. 7) mounted on the control board 90. This causes an electromagnetic force to be generated at the stator 44, whereby a rotor 45 provided inside the stator 44 is driven by a predetermined driving torque (driving force) so as to rotate in a predetermined direction.

As shown in FIGS. 3 and 4, the rotor 45 is rotatably provided inside the stator 44 in the radial direction via a predetermined gap (air gap). The rotor 45 is formed into a substantially columnar shape by stacking a plurality of steel plates made of a magnetic material (not shown in the drawing) and bonding them together. A permanent magnet 45a formed in a substantially cylindrical shape is mounted on an outer surface of the rotor 45 in its radial direction.

The permanent magnet 45a is magnetized as four magnetic poles such that the four magnetic poles are arranged alternately (N pole→S pole→N pole→S pole) along a direction of rotation of the rotor 45. In this manner, as the DR-side wiper motor 21, a brushless motor with a surface permanent magnet (SPM) structure in which the permanent magnet 45a is attached to the surface of the rotor 45 is adopted. However, the DR-side wiper motor 21 is not limited to the brushless motor with the SPM structure. A brushless motor with an IPM structure, in which a plurality of permanent magnets is embedded in the rotor 45, may also be adopted as the DR-side wiper motor 21.

Further, in place of the single permanent magnet 45a with the substantially cylindrical shape, one in which four permanent magnets each of which has a substantially arc shape as a sectional shape in a direction intersecting an axis line of the rotor 45 are arranged at equal intervals such that their magnetic poles alternate along a circumferential direction of the rotor 45 may be adopted.

In this manner, the DR-side wiper motor 21 according to the present embodiment uses a 4-pole/6-slot type brushless motor as a driving source. As a result, as shown in FIG. 4, a shape of the stator 44 becomes mirror symmetric with respect to the rotor 45. Therefore, as indicated by arrows with heavy lines in FIG. 4, magnetic attractive forces F of the stator 44, which are generated when the rotor 45 is rotated, act so as to cancel each other along the direction of rotation of the rotor 45. This suppresses excitation of the rotor 45, and suppresses the rotational deflection of the rotor 45 and rotating shaft 46. As a result, generation of mechanical noises can be suppressed effectively.

Moreover, a frequency of the magnetic noises generated when the rotor 45 is rotated falls within a low frequency range of about 160 Hz to 400 Hz when the DR-side wiper motor 21 operates in a normal mode (at the time of a Lo-level operation). Here, by offsetting the frequency of the magnetic noises to a lower frequency side, it is possible to prevent the noises from being heard. Generally, a sense of hearing of a human more readily catches and perceives noise with a high frequency than noise with a low frequency. In the case of focusing on a point of view of reducing magnetic noises, a 2-pole/3-slot type brushless motor becomes an ideal type as the DR-side wiper motor 21. However, the DR-side wiper motor 21 is also required to suppress mechanical noises from being generated as described above. For that reason, the 4-pole/6-slot type brushless motor is adopted as the minimum combination of poles and slots that can satisfy both suppression of generation of mechanical noise and suppression of generation of magnetic noise.

As shown in FIGS. 3, 4, and 6, one end side of the rotating shaft 46 in an axial direction (at a right side in FIG. 6) is fixed at a shaft center of the rotor 45. A worm 46b provided with spiral teeth 46a formed by rolling or the like is integrally provided at the other end side of the rotating shaft 46 in the axial direction (at a left side in FIG. 6). Here, the worm 46b formed on the rotating shaft 46 is disposed closer to the decelerating mechanism housing unit 42 than the through hole 41c. The worm 46b and a worm wheel 50 engaging with the worm 46b constitute a decelerating mechanism SD.

A first ball bearing 47 is disposed between the rotor 45 and the worm 46b along the axial direction of the rotating shaft 46. The first ball bearing 47 is composed of an outer ring 47a and an inner ring 47b, which are made of steel, and a plurality of steel balls 47c, which are provided between the outer ring 47a and the inner ring 47b. The inner ring 47b is fixed to the rotating shaft 46 by fixing means (not shown in the drawing), such as a retaining ring and caulking. The outer ring 47a is fitted in a first bearing fitting portion 48 provided between the motor housing unit 41 and the decelerating mechanism housing unit 42 of the housing 40.

Here, the first ball bearing 47 is fixed to the first bearing fitting portion 48 by pressing it to the first bearing fitting portion 48 by means of a stopper member 48a having elasticity. By fixing the first ball bearing 47 to the first bearing fitting portion 48 in this manner, the rotating shaft 46 cannot move in the axial direction. Therefore, the rotating shaft 46 is allowed to smoothly rotate inside the housing 40 without rattling in the axial direction.

As shown in FIG. 6, a second ball bearing 49 is fitted to the other end side of the rotating shaft 46 in the axial direction. Similar to the first ball bearing 47, the second ball bearing 49 is composed of an outer ring 49a and an inner ring 49b, which are made of steel, and a plurality of steel balls (not shown in the drawing), which are provided between the outer ring 49a and the inner ring 49b. As the second ball bearing 49, a ball bearing smaller than the first ball bearing 47 is adopted.

Here, the first ball bearing 47 has a function to rotatably support the rotating shaft 46 and support the rotating shaft 46 so that the rotating shaft 46 cannot move in the axial direction. For this reason, the first ball bearing 47 is provided so as to become large and sturdy. On the other hand, the second ball bearing 49 has only a function to suppress the rotational deflection of the other end side of the rotating shaft 46 in the axial direction. For this reason, the second ball bearing 49 with a small size can exert this function adequately.

According to the present embodiment, miniaturization of the DR-side wiper motor 21 is realized by adopting a brushless motor as the DR-side wiper motor 21 and increasing a reduction gear ratio of the decelerating mechanism SD. Therefore, a pitch of the teeth 46a of the worm 46b becomes narrow, and the worm 46b rotates at a high speed. For that reason, in the present embodiment, the second ball bearing 49 is provided in order to suppress the rotational deflection of the rotating shaft 46 at the worm 46b side to improve quietness as well as rotation efficiency. Here, depending upon the required reduction gear ratio of the decelerating mechanism SD (specification of the wiper motor), the second ball bearing 49 may be omitted from the DR-side wiper motor 21.

As shown in FIG. 6, an annular first sensor magnet MG1 is fixed between the worm 46b and the first ball bearing 47 along the axial direction of the rotating shaft 46. In other words, both the worm 46b and the first sensor magnet MG1 are disposed between the first ball bearing 47 and the second ball bearing 49.

Here, an axial dimension L1 of the rotor 45 (permanent magnet 45a) is made smaller than an axial dimension L2 of the worm 46b (L1<L2). This reduces a size of the DR-side wiper motor 21 along the axial direction of the rotating shaft 46 thereof. Further, since the DR-side wiper motor 21 is a brushless motor, it has no commutator or brush. This feature also contributes to a reduction in the size of the DR-side wiper motor 21 along the axial direction of the rotating shaft 46 thereof.

The first sensor magnet MG1 is magnetized so as to have a plurality of magnetic poles (S poles and N poles) arranged along the direction of rotation of the rotating shaft 46. A first Hall IC 94a, a second Hall IC 94b, and a third Hall IC 94c are arranged on an opposing portion to the first sensor magnet MG1 on the control board 90 (see FIG. 7). These Hall ICs 94a, 94b, and 94c detect a rotation status of the rotating shaft 46 (the number of rotations, the direction of rotation, and the like).

As shown in FIGS. 2 and 5, the decelerating mechanism housing unit 42 is formed substantially into a bottomed, bathtub shape. In the decelerating mechanism housing unit 42, a bottom 42a and a side wall 42b formed so as to enclose the bottom 42a are provided. Further, an opening 42c is provided on a side of the side wall 42b that is opposite to the bottom 42a (an upper side in FIG. 5). The bottom 42a and the opening 42c are opposite to each other in an axial direction of the worm wheel 50. The opening 42c is sealed by the gear cover 80 (see FIG. 7).

A boss 42d is integrally provided on the bottom 42a of the decelerating mechanism housing unit 42 so that the boss 42d projects toward the outside of the decelerating mechanism housing unit 42 (at an upper side in FIG. 2). Three mounting legs (fixing legs) 42e are integrally provided on the side wall 42b of the decelerating mechanism housing unit 42 so that the mounting legs 42e project radially from the boss 42d as a central portion. Rubber bushes RB, through each of which a fixing bolt (not shown in the drawing) is configured to put, are attached to two of these mounting legs 42e, respectively. Further, an insertion rubber IR, which is configured to be inserted in the DR-side insertion fixing portion 14a (see FIG. 1), is attached to the remaining one of the mounting legs 42e.

In this manner, the DR-side wiper motor 21 is fixed to the vehicle 10 via the rubber bushes RB and the insertion rubber IR, and each of the rubber bushes RB and the insertion rubber IR function as buffering members. Therefore, when the DR-side wiper motor 21 is fixed to the vehicle 10 (see FIG. 1), vibration of the DR-side wiper motor 21 is hardly transmitted to the vehicle 10, and this further improves the quietness of the vehicle 10. Conversely, since vibration of the vehicle 10 is hardly transmitted to the DR-side wiper motor 21, it is possible to protect the DR-side wiper motor 21 from the vibration.

As shown in FIGS. 3 and 5, the worm wheel 50 is rotatably housed inside the decelerating mechanism housing unit 42. The worm wheel 50 is made of, for example, polyacetal (POM) resin and is formed into a substantially disc shape. Gear teeth (teeth) 50a are formed on the outer periphery of the worm wheel 50. The teeth 46a of the worm 46b engage with the gear teeth 50a of the worm wheel 50.

One end side of an output shaft 51 in an axial direction is fixed to a center of rotation of the worm wheel 50. The output shaft 51 is rotatably supported by the boss 42d of the decelerating mechanism housing unit 42. The other end side of the output shaft 51 in the axial direction extends to the outside of the decelerating mechanism housing unit 42, and a base end of the DR-side wiper arm 22 (see FIG. 1) is fixed to the other end of the output shaft 51 in the axial direction. This causes the output shaft 51 to be rotated by means of the rotor 45 (see FIG. 3). Specifically, speed of rotation of the rotating shaft 46 is reduced by the decelerating mechanism SD to create a high torque, whereby turning force with the high torque thus reduced is transmitted from the output shaft 51 to the DR-side wiper arm 22 provided outside the decelerating mechanism housing unit 42. In this manner, the decelerating mechanism SD reduces the speed of rotation of the rotor 45, and transmits the turning force with the high torque, which is created by reducing the speed of rotation, to the DR-side wiper arm 22.

As shown in FIG. 5, a disc-shaped second sensor magnet MG2 is fixed at the center of rotation of the worm wheel 50 and at a side opposite to the side on which the output shaft 51 is provided. The second sensor magnet MG2 is magnetized so as to have a plurality of magnetic poles (S poles and N poles) arranged along the direction of rotation of the output shaft 51. The second sensor magnet MG2 is provided at one end side of the output shaft 51 in the axial direction, and is rotated together with the output shaft 51 and worm wheel 50. An MR sensor 95 is disposed on an opposing portion to the second sensor magnet MG2 on the control board 90 (see FIG. 7). The MR sensor 95 thus detects rotation statuses (the direction of rotation, a rotational position, and the like) of the output shaft 51 and the worm wheel 50.

As shown in FIG. 5, a second bearing fitting portion 52 is provided on the side wall 42b of the decelerating mechanism housing unit 42. The second bearing fitting portion 52 is disposed coaxially with the first bearing fitting portion 48 (see FIG. 3), and a second ball bearing 49 is housed in the second bearing fitting portion 52. Here, the second ball bearing 49 is fitted in the second bearing fitting portion 52 by putting the second ball bearing 49 through the through hole 41c and the first bearing fitting portion 48 in a state where the second ball bearing 49 is mounted on the other end side of the rotating shaft 46 in the axial direction.

The second ball bearing 49 is not pressed into the second bearing fitting portion 52, but is fitted loosely therein with a small clearance. As a result, for example, even if imperfect alignment between the first bearing fitting portion 48 and the second bearing fitting portion 52 occurs slightly at the time of manufacturing the housing 40, rotational resistance of the rotating shaft 46 does not increase. This also suppresses mechanical noises generated by the DR-side wiper motor 21, whereby it is possible to improve its quietness.

As shown in FIGS. 2, 3, and 5, the motor cover 60 is formed into a bottomed, cylindrical shape. The motor cover 60 includes a bottom 61 formed into a substantially disc shape and a cylindrical wall 62 that encircles the bottom 61. A concave portion 61a hollowed toward the cylindrical wall 62 is provided at a central portion of the bottom 61. The concave portion 61a is provided in order to enhance the strength of the bottom 61. In other words, by providing the concave portion 61a on the bottom 61, the bottom 61 is hardly bended. This prevents the motor cover 60 from resonating with the vibration or the like when the DR-side wiper motor 21 is operated, whereby the quietness of the DR-side wiper motor 21 is improved.

As shown in FIG. 3, the fitting portion 62a, which is fitted on the cover fitting portion 41a of the motor housing unit 41, is provided at a portion of the cylindrical wall 62 that is closer to the motor housing unit 41. This fitting portion 62a is formed into an annular shape, and is also formed into a stepped shape in the same manner as the cover fitting portion 41a so that the fitting portion 62a fits with the cover fitting portion 41a.

As shown in FIG. 7, the gear cover 80 seals the opening 42c (see FIG. 5) of the decelerating mechanism housing unit 42, and has an outline shape slimier to that of the opening 42c. The gear cover 80 includes a bottom wall 81 and a side wall 82. The control board (board) 90 is fixed to the bottom wall 81 inside the gear cover 80 by means of first fixing screws SC1.

Further, a connector connecting portion 82a, to which an outer connector (not shown in the drawing) on the vehicle 10 side is connected, is integrally provided on the side wall 82 of the gear cover 80. Terminals (not shown in the drawing)

at one end sides of a plurality of conductive members CM are exposed inside the connector connecting portion 82a. On the other hand, terminals TM at the other end sides of the conductive members CM are electrically connected to the control board 90. An on-vehicle battery and a wiper switch (not shown in the drawing) are electrically connected to the outer connector on the vehicle 10 side.

As shown in FIG. 7, the control board 90 includes a first surface 91 and a second surface 92. The first surface 91 faces a side of the gear cover 80 opposite to the bottom wall 81, that is, the side on which the rotating shaft 46 and output shaft 51 are arranged (an upper side in FIG. 7). The second surface 92 faces the bottom wall 81 side of the gear cover 80, that is, the side opposite to the first surface 91 (a lower side in FIG. 7).

A CPU 93, the first Hall IC 94a, the second Hall IC 94b, and the third Hall IC 94c, and the MR sensor 95 are provided on the first surface 91 of the control board 90. The CPU 93 is configured to totally control the DR-side wiper motor 21. The first, second, and third Hall ICs 94a, 94b, and 94c face the first sensor magnet MG1 (see FIG. 6). The MR sensor 95 faces the second sensor magnet MG2 (see FIG. 5). The three Hall ICs 94a, 94b, and 94c are arranged at predetermined intervals along the direction of rotation of the first sensor magnet MG1.

On the other hand, an FET module 96 and a capacitor CP are provided on the second surface 92 of the control board 90. The FET module 96 is an electronic component for a driving system. The capacitor CP is another electronic component. Here, the FET module 96 is composed of a plurality of switching elements that switch energized states of the respective coils 44c of three phases (see FIG. 4) at a high speed. Therefore, the FET module 96 tends to generate heat. Accordingly, in order to improve a heat dissipation property of the FET module 96, the FET module 96 is connected to the housing 40 via a heat conductive member 97a and a heat conductive sheet 97b.

As shown in FIG. 7, the FET module 96 is fixed to the bottom wall 81 of the gear cover 80 by means of a pair of second fixing screws SC2 before the control board 90 is mounted on the bottom wall 81 of the gear cover 80. Then, the FET module 96 is actually mounted on the second surface 92 of the control board 90 by connecting means such as soldering.

Here, the CPU 93 and the FET module 96 are configured to supply a drive current to the DR-side wiper motor 21 to control the rotation of the rotor 45 (see FIG. 4). The CPU 93 controls the FET module 96 on the basis of values (rectangular wave signals) detected by each of the Hall ICs 94a, 94b, and 94c and the MR sensor 95. Thus, the rotation of the rotor 45 is controlled.

Here, it was found that, when the acoustic sensitivities (dB) of vehicle interiors (near the driver's seat) of a light vehicle, a midsize vehicle, and a luxury vehicle are compared with each other, a tendency indicated in a graph of FIG. 8 is shown during a normal operation (at the time of a Lo-level operation). Namely, since the light vehicle (a weight of the vehicle is less than 1 ton and the like) is designed with emphasis on reduction of its weight, for example, a portion with low rigidity exists. For that reason, in the case of the light vehicle, noises with high frequencies of about 1 kHz echo in the vehicle interior thereof easily compared with the case of the midsize vehicle and luxury vehicle.

On the other hand, since the case of the luxury vehicle (a weight of the vehicle is a 2-ton class and the like) is designed with emphasis on the quietness of its vehicle interior, the luxury vehicle often adopts lots of steel plates with high rigidity and adds a noise-proofing sheet. For this reason, in the case of the luxury vehicle, noises with high frequencies of about 1 kHz hardly echo in the vehicle interior thereof. The midsize vehicle (a weight of the vehicle is less than 1.5 ton and the like) has acoustic sensitivity (dB) of the vehicle interior between that of the light vehicle and that of the luxury vehicle.

In contrast, in a low frequency range of about 150 Hz to 300 Hz, which corresponds to the frequency of mechanical noises from the decelerating mechanism SD, each of the light vehicle, the midsize vehicle, and the luxury vehicle has the acoustic sensitivities (dB) that is not that different to each other. In other words, it can be said that the noises with a low frequency range of about 150 Hz to 300 Hz are noises that hardly echo in the vehicle interior and are hardly heard regardless of the rigidity of the vehicle body or the like.

Here, the DR-side wiper motor 21 according to the present invention is the 4-pole/6-slot type brushless motor in which the stator 44 is fixed to the housing 40, which is fixed to the vehicle 10. Therefore, this structure allows the magnetic noises, which has low frequencies of about 150 Hz to 500 Hz, from the DR-side wiper motor 21 to be easily matched with a low frequency range of about 160 Hz to 400 Hz.

Therefore, by matching both the frequencies of magnetic noises and the frequencies of mechanical noises generated by the DR-side wiper motor 21 to be integrated into a low frequency range of about 150 Hz to 500 Hz, more preferably, to a narrower low frequency range of about 160 Hz to 400 Hz, it is possible to reduce a difference in the acoustic sensitivity (dB) between the light vehicle and the luxury vehicle (which is indicated by the area of a hatched portion (a) in FIG. 8, that is, a difference between the maximum acoustic sensitivity and the minimum acoustic sensitivity). This allows the DR-side wiper motor 21 to be applied to the light vehicle as well as to the luxury vehicle without any problem. In other words, according to the DR-side wiper motor 21 of the present invention, its versatility can be improved widely by integrating the frequency range of noises generated by the DR-side wiper motor 21 into a low frequency range.

Furthermore, reduction in variation of the frequencies (the width of the overall frequency range of the motor) allows the frequency range for implementing measure against noise to be limited. For this reason, further measure against noise using buffering members (insertion rubbers IR, rubber bushes RB, and the like) becomes easy. Here, a target for noise suppression is generally determined to some extent according to a material making up the buffering member such as buffering members dedicated to suppress noises with high frequencies, buffering members dedicated to suppress noises with low frequencies, and the like. For that reason, in a case where frequency variation of targeted motors (the width of the overall frequency range of the motor) is wide, it becomes difficult to carry out measure against the whole noises for the motor.

Further, a motor with a brush described as a reference example has many magnetic poles (for example, four magnetic poles) in association with reduction in its size and weight. Such a motor is provided with three brushes in order to be capable of changing its wiping speed between a "Hi level" and a "Lo level". This motor with the brushes generates magnetic noises with high frequencies, especially frequencies around 1 kHz. For that reason, a difference in the acoustic sensitivity (dB) between the light vehicle and the luxury vehicle (which is indicated by the area of a hatched portion (b) in FIG. 8, that is, a difference between the maximum acoustic sensitivity and the minimum acoustic sensitivity) becomes large, and it becomes difficult to apply the motor to the light vehicle.

Moreover, the conventional technique described in Background of the Invention adopted a brushless motor (6-pole/9-slot type motor) having more magnetic poles and slots than those of the motor according to the present invention. In this motor, a stator is fixed to a yoke that is a separate element to a gear housing. Therefore, magnetic noises from the motor according to the conventional technique are higher in frequency than the magnetic noises from the motor according to the present invention, and have a frequency around 600 Hz. For that reason, in the case of the motor of the conventional technique, a difference in the acoustic sensitivity (dB) between the light vehicle and the luxury vehicle (which is indicated by the area of a hatched portion (c) in FIG. 8, that is, a difference between the maximum acoustic sensitivity and the minimum acoustic sensitivity) becomes larger than in the case of the motor according to the present invention. Further, since the stator is fixed to the vehicle via two elements, that is, the yoke and the gear housing in the motor of the conventional technique, variation in noises generated by various products occurs in a frequency range of about 150 Hz to 775 Hz, which is wider than the frequency range of noises achieved by the present invention, due to variation in the fixing strength of the yoke and the gear housing.

As described above in detail, according to the present embodiment, by constituting the brushless wiper motor as the 4-pole/6-slot type, the shape of the stator 44 can be made mirror symmetric with respect to the rotor 45. Therefore, rotational deflection of the rotor 45 can be suppressed. Further, as the minimum number of poles and the minimum number of slots that can suppress the rotational deflection of the rotor 45, a frequency of magnetic noises generated during the rotation of the rotor can approach a frequency of mechanical noises of the decelerating mechanism SD (low frequency around a frequency range of about 150 Hz to 300 Hz). This makes it possible to integrate each of frequencies of magnetic noises and mechanical noises generated by the DR-side wiper motor 21 into a low frequency range thereof. Thus, it is possible to reduce the acoustic sensitivity (dB) of the vehicle interior to improve the quietness of the motor. Therefore, the brushless wiper motor can easily be applied to light vehicles and luxury vehicles, and it can also be applied to electric vehicles, hybrid vehicles and the like (improvement in general versatility).

Further, the mounting legs 42e that are respectively fixed to the cowl top panel 12, the front side member 13, and the dash panel upper 14 are provided in the housing 40 while fixing the stator 44 inside the housing 40. Thus, the stator 40, which is a source of the magnetic noises, can be fixed to the vehicle 10 only via the housing 40. Therefore, the acoustic sensitivity (dB) of the vehicle interior can be estimated easily by merely calculating rigidity of the housing 40, for example. In other words, it becomes possible to design a brushless wiper motor having a structure advantageous for improvement of quietness certainly and easily. This makes it possible to provide a brushless wiper motor with quietness improved further.

Moreover, according to the present embodiment, the decelerating mechanism SD has the worm 46b rotated by the rotor 45, and the worm wheel 50 provided with the gear teeth 50a that is configured to engage with the worm 46b wherein the output shaft 51 is provided on the center of rotation of the worm wheel. The axial dimension L1 of the rotor 45 is made smaller than the axial dimension L2 of the worm 46b (L1<L2). This makes it possible to make the size of the DR-side wiper motor 21 along the axial direction of the rotating shaft 46 smaller, and it is possible to reduce weight thereof further. Thus, it is possible to apply the DR-side wiper motor 21 to light vehicles easily.

Further, according to the present embodiment, the mounting legs 42e are fixed to the cowl top panel 12, the front side member 13, and the dash panel upper 14 via the rubber bush RB, the rubber bush RB, and the insertion rubber IR, respectively. Therefore, the vibration of the DR-side wiper motor 21 is hardly transmitted to the vehicle 10. This makes it possible to make the acoustic sensitivity (dB) of the vehicle interior smaller. Further, the DR-side wiper motor 21 is protected from the vibration of the vehicle 10. This makes it possible to prevent the DR-side wiper motor 21 from being damaged quickly.

Moreover, according to the present embodiment, the frequencies of noises generated by the DR-side wiper motor 21 can be integrated into a low frequency range. This makes it possible to improve the versatility of the DR-side wiper motor 21 significantly. Furthermore, reduction in variation of the frequencies (the width of the overall frequency range of the motor) allows the frequency range for implementing measure against noise to be limited. For this reason, further measure against noise using buffering members (insertion rubbers IR, rubber bushes RB, and the like) becomes easy.

Moreover, according to the present embodiment, the frequencies of noises generated by the DR-side wiper motor 21 can be integrated into a low frequency range. For this reason, an influence of operating noise by the vehicle can be reduced. In other words, the DR-side wiper motor 21 is hardly influenced by vibration or the like from the vehicle by narrowing the width of the overall frequency range of the motor. For this reason, it is possible to suppress a resonance and/or vibration amplification from being generated, and as a result, the operating noise of the DR-side wiper motor 21 can be reduced.

According to the present embodiment, as a formula for calculating the frequency (Hz) of noise of the DR-side wiper motor 21, the frequency (Hz) is calculated by a formula: {(the number of slots or the number of teeth)×(the number of rotations of the output shaft (rpm))×(the reduction gear ratio)}/60. This formula puts emphasis on a frequency component caused by the slots or teeth.

Next, a second embodiment according to the present invention will be described in detail with reference to the drawings. Note that the same reference numerals are respectively applied to portions that have the similar functions to those of the first embodiment described above, and detail description thereof is omitted.

Figure 9:
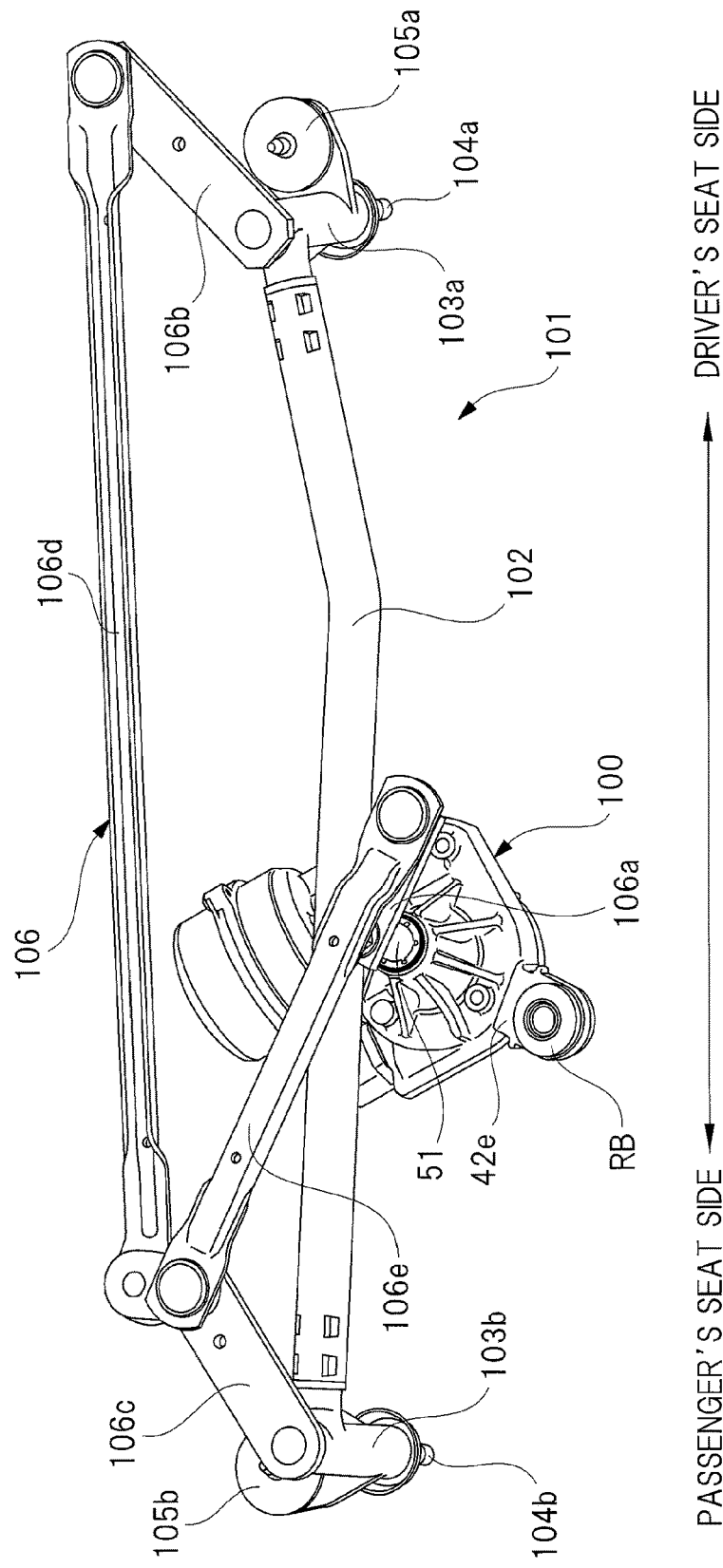
FIG. 9 is a perspective view of a wiper device according to a second embodiment.

FIG. 9 shows a perspective view of a wiper device according to the second embodiment.

In the first embodiment described above, as shown in FIG. 1, the so-called twin wiper apparatus has been described in which the DR-side wiper device 20 and the AS-side wiper device 30 are mounted on the driver's seat side and the passenger's seat side along the vehicle width direction of the vehicle 10, respectively, and the DR-side wiper arm 22 and the AS-side wiper arm 32 are driven to swing at their respective swing angles, respectively. In contrast, as shown in FIG. 9, a case where a brushless wiper motor 100 is applied to a modular wiper device 101 is shown in the second embodiment.

The modular wiper device 101 includes a pipe frame 102. A portion of the brushless wiper motor 100 that substantially serves as the center of gravity is fixed to an approximate central part of the pipe frame 102 in its longitudinal direction (not shown in the drawing in detail). Therefore, the modular wiper device 101 is well balanced in weight, thereby easily carrying it as a single wiper device. Here, the brushless wiper motor 100 applied to the modular wiper device 101 includes one mounting leg 42e that is fixed by a fixing bolt (not shown in the drawing). This mounting leg 42e is fixed to a dash panel upper 14 (see FIG. 1), which serves as a vehicle body fixed portion, via a rubber bush RB. Further, the rubber bush RB provided on the mounting leg 42e may be replaced by an insertion rubber IR to fix the mounting leg 42e to a vehicle. Structural elements of the brushless wiper motor 100 other than the structural elements described above are the same as the structural elements of the DR-side wiper motor 21 according to the first embodiment.

A first pivot holder 103a and a second pivot holder 103b are fixed to both sides of the pipe frame 102 in the longitudinal direction, respectively. The first and second pivot holders 103a, 103b rotatably support a first pivot 104a and a second pivot 104b, respectively. Here, a first mounting portion 105a and a second mounting portion 105b, which are respectively fixed to front side members 13 (see FIG. 1), are provided on the first pivot holder 103a and the second pivot holder 103b.

A link mechanism 106 is provided between base ends of the first and second pivots 104a, 104b. The link mechanism 106 is configured to transmit a swinging motion of an output shaft 51 to the first and second pivots 104a, 104b. Base ends of wiper arms 22, 32 (see FIG. 1) are fixed to front ends of the first and second pivots 104a, 104b, respectively. In other words, the link mechanism 106 is disposed between the output shaft 51 and the wiper arms 22, 32.

The link mechanism 106 is composed of a crank arm 106a, a pair of drive levers 106b, 106c, a connection rod 106d, and a drive rod 106e. The crank arm 106a is fixed to the output shaft 51. The pair of drive levers 106b, 106c is fixed to the base ends of the first and second pivots 104a, 104b, respectively. The connection rod 106d is provided between the drive lever 106b and the drive lever 106c. The drive rod 106e provided between the drive lever 106c and the crank arm 106a.

Here, each of the crank arm 106a, the drive levers 106b, 106c, the connection rod 106d, and drive rod 106e, which constitute the link mechanism 106, is formed into a predetermined shape by pressing a steel plate. This process also contributes to weight saving.

The second embodiment configured as described above can achieve the same effects as those of the first embodiment.

The present invention is not limited to each of the above embodiments. It goes without saying that the present invention may be modified into various forms of applications without departing from the substance of the invention. For example, in the first embodiment, it has been described that the three mounting legs 42e are provided in the DR-side wiper motor 21, one of the three mounting legs 42e is provided as an insertion type mounting leg, and the other two of them are provided as bolt-fixed type mounting legs. However, the present invention is not limited to this, and all of the three mounting legs 42e may be provided as the bolt-fixed type mounting legs.

Further, in each of the embodiments described above, it has been described that the DR-side wiper motor 21 and the brushless wiper motor 100 drives the DR-side wiper arm 22 and AS-side wiper arm 32 so as to swing on the windshield 11, respectively. However, the present invention is not limited to this, and can also be adopted as a wiper motor that drives a wiper arm so as to swing on the rear window.

Moreover, in each of the embodiments described above, it has been described that the present invention is applied to an inner rotor type brushless wiper motor in which the rotor 45 is rotatably disposed inside the stator 44. However, the present invention is not limited to such a wiper motor, but can also be applied to an outer rotor type brushless wiper motor in which a rotor is disposed outside a stator.

A brushless wiper motor is used as a driving source for a wiper device that is mounted on a vehicle such as an automobile, and is used to drive a wiper arm to swing and wipe rainwater and the like attached onto a windshield away from the windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A brushless wiper motor configured to cause a wiper member to swing, the wiper member wiping an object attached onto a windshield of a vehicle away from the windshield, the brushless wiper motor comprising:
   a stator fixed inside a housing, a plurality of teeth being formed on an inner periphery of the stator;
   a coil wound around the teeth;
   a rotor configured to rotate with respect to the stator;
   a permanent magnet provided on the rotor, the permanent magnet having four magnetic poles arranged alternately along a direction of rotation of the rotor;
   a decelerating mechanism housed in the housing, the decelerating mechanism being configured to reduce speed of rotation of the rotor;
   an output shaft configured to transmit rotation of the decelerating mechanism to the wiper member; and
   a plurality of fixing legs provided on the housing,
   wherein the housing includes a motor housing unit that houses the stator and a decelerating mechanism housing unit that houses the decelerating mechanism,
   wherein the motor housing unit is formed into a bottomed cylindrical shape, a stepped portion is formed on the interior of the motor housing unit, and an end portion of the stator in an axial direction of the rotor abuts on the stepped portion, and
   wherein at least one of the plurality of fixing legs is fixed to a vehicle body fixed portion that extends in a right-to-left direction of the vehicle.

2. The brushless wiper motor according to claim 1, wherein frequencies of noises generated by the brushless wiper motor is made equal to or lower than 500 Hz.

3. The brushless wiper motor according to claim 1, wherein the decelerating mechanism includes:
   a worm rotated by the rotor; and
   a worm wheel provided with teeth, the teeth being configured to engage with the worm, the output shaft being provided on a center of rotation of the worm wheel,
   wherein an axial dimension of the rotor is smaller than an axial dimension of the worm.

4. The brushless wiper motor according to claim 1, wherein at least one of the plurality of fixing legs is fixed to the vehicle body fixed portion via a buffering member.

5. The brushless wiper motor according to claim 1, wherein the stator is provided with teeth each of which faces other one with respect to the rotor.

6. The brushless wiper motor according to claim 1,
wherein a number of teeth is six, and
wherein frequencies of noises generated by the brushless wiper motor is made lower than 600 Hz.

* * * * *